United States Patent [19]
Bennett

[11] Patent Number: 6,082,810
[45] Date of Patent: Jul. 4, 2000

[54] CARGO VEHICLE FLOOR CONSTRUCTION AND METHOD

[75] Inventor: Jeffrey J. Bennett, City of Industry, Calif.

[73] Assignee: Utility Trailer Manufacturing Company, City of Industry, Calif.

[21] Appl. No.: 09/157,087

[22] Filed: Sep. 18, 1998

[51] Int. Cl.[7] .................................................. B62D 33/02
[52] U.S. Cl. ........................ 296/182; 296/183; 296/204; 52/582.2; 52/584.1
[58] Field of Search .................................... 296/181, 183, 296/182, 204; 52/578, 582.1, 582.2, 584.1, 588.1

[56] References Cited

U.S. PATENT DOCUMENTS

| | | | |
|---|---|---|---|
| 1,913,342 | 6/1933 | Schaffert | 52/588.1 |
| 2,718,288 | 9/1955 | Boyer | 296/204 X |
| 3,080,021 | 3/1963 | Muir | 296/182 X |
| 3,128,851 | 4/1964 | DeRidder et al. | 52/588.1 |
| 4,951,992 | 8/1990 | Hockney | 296/181 X |
| 5,050,362 | 9/1991 | Tal et al. | 52/588.1 |
| 5,950,377 | 9/1999 | Yoder | 52/177 |

FOREIGN PATENT DOCUMENTS

| | | | |
|---|---|---|---|
| 296216 | 1/1954 | Switzerland | 196/183 |
| 835260 | 5/1960 | United Kingdom | 196/181 |

*Primary Examiner*—Dennis H. Pedder
*Attorney, Agent, or Firm*—Lyon & Lyon LLP

[57] ABSTRACT

A cargo floor construction and method of constructing same that includes a multiplicity of mounting clips that are secured to the cargo vehicle support members in laterally spaced and longitudinally aligned rows. The mounting clips are provided with a shape for mating and interlocking with the lateral edges of longitudinally extending floor planks that preferably are extruded with the mating edge shapes. Fasteners are used to secure the mounting clips to the vehicle support members but those fasteners do not pierce the floor planks. In some embodiments of the interlocking mounting clips and floor plank edges, the floor plank is elastically deformed to engage or snap onto the mounting clip to prevent lateral movement of the floor plank in either direction.

32 Claims, 3 Drawing Sheets

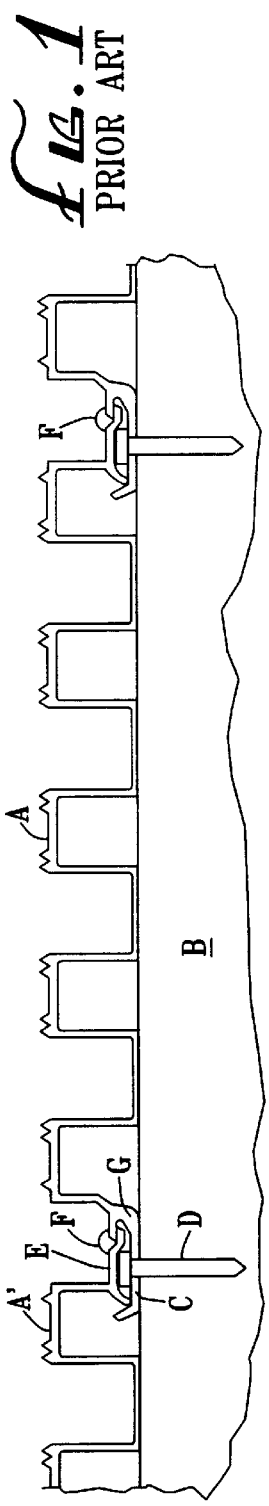
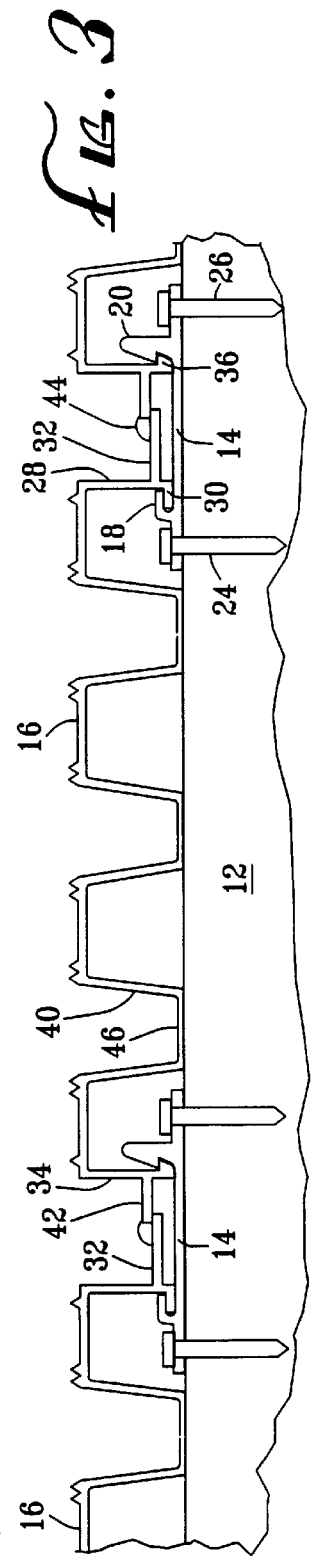
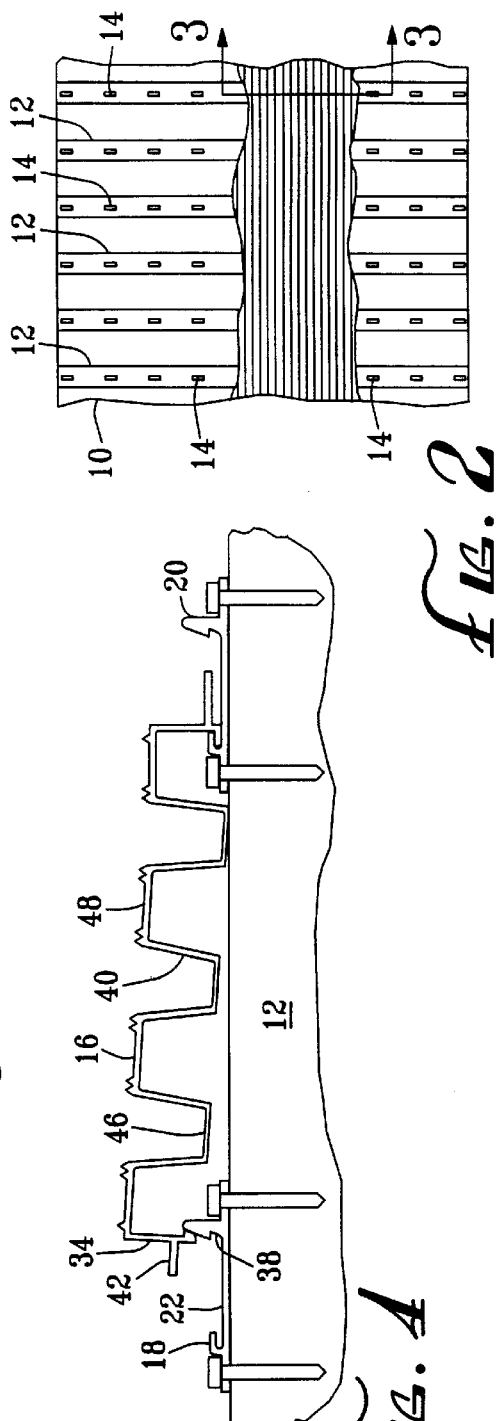

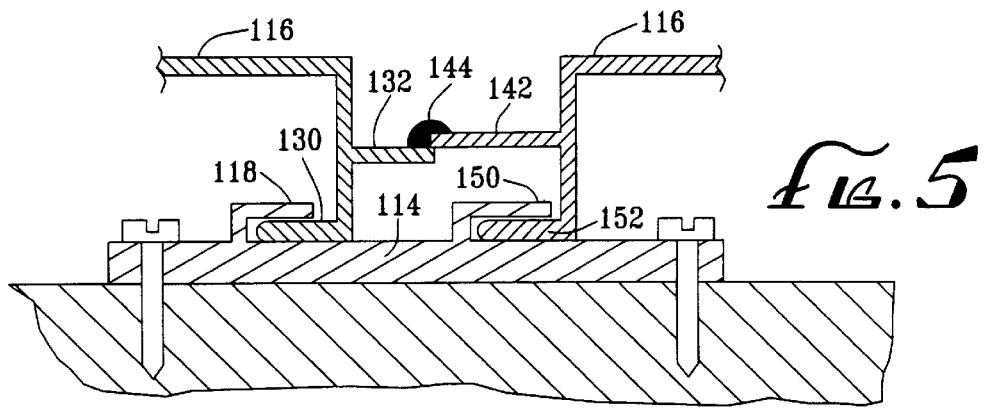
*fig. 5*
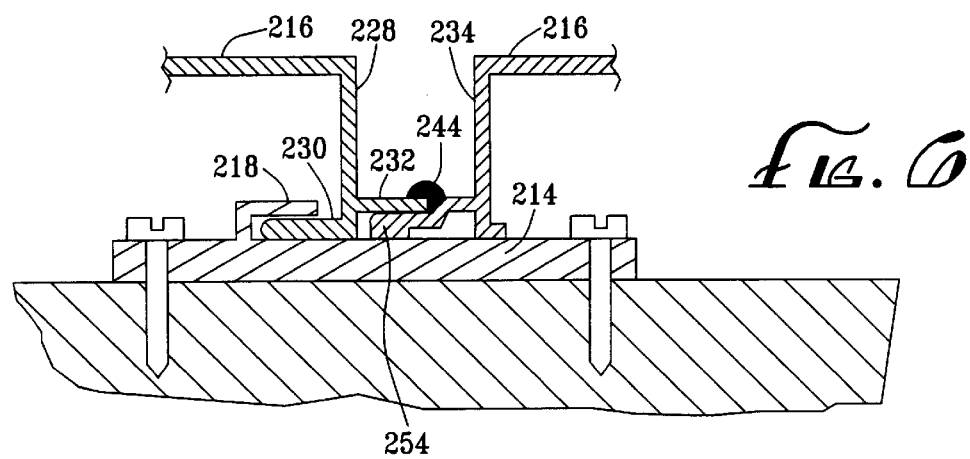
*fig. 6*
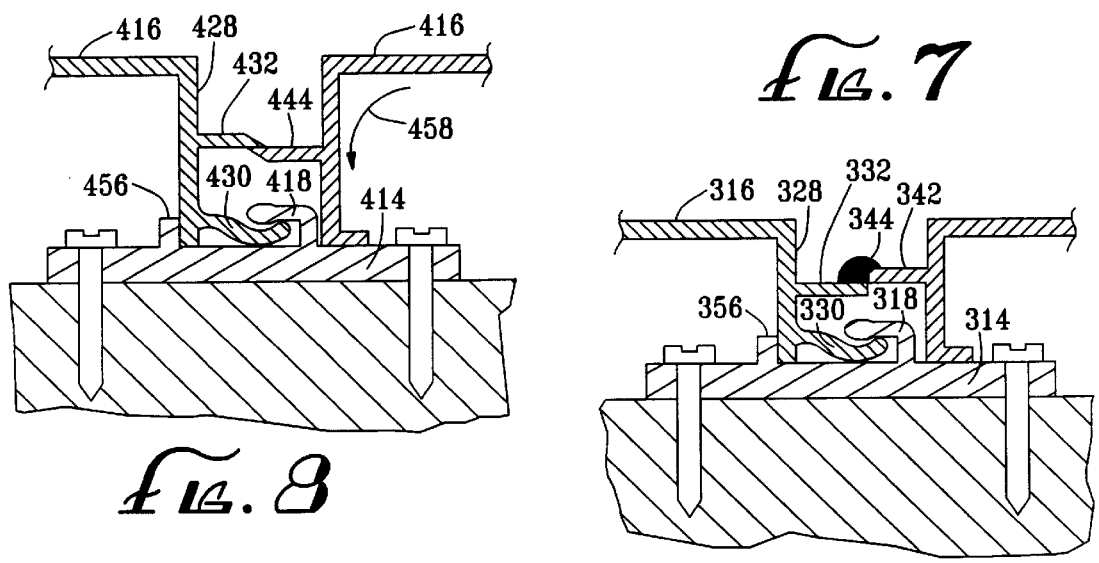
*fig. 8*
*fig. 7*

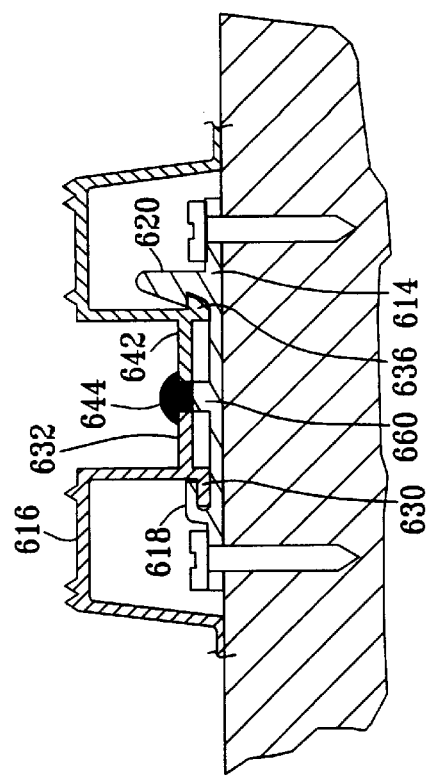
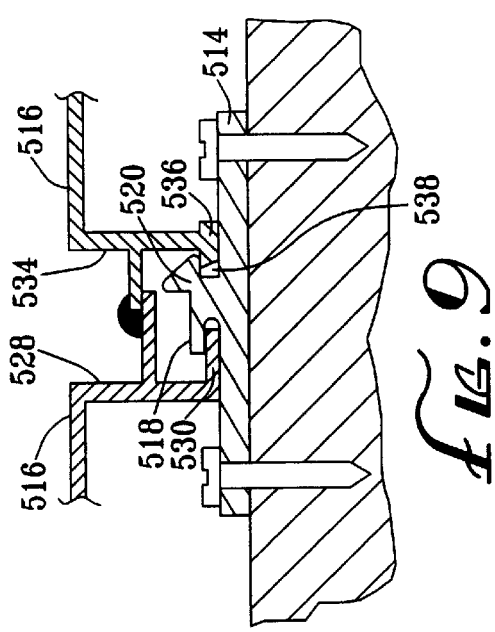
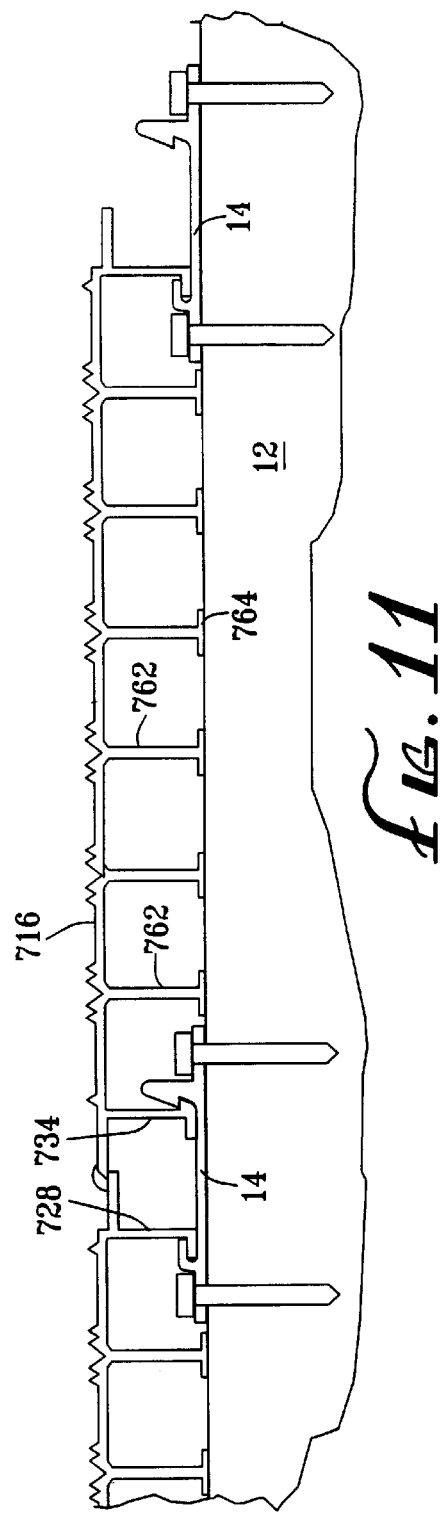

CARGO VEHICLE FLOOR CONSTRUCTION AND METHOD

This invention relates to the construction of a metal floor of a cargo vehicle, such as a dry or refrigerated trailer, and the method of constructing that floor.

One typical floor construction for cargo vehicles, such as refrigerated trailers and dry vans, is to use extruded aluminum floor planks that extend the length of the trailer floor, to fasten the edge of each plank to each cross-member of the trailer or truck with a screw or other type of through fastener, and to weld the adjacent edges of the floor planks together. One such typical prior art floor construction for a refrigerated trailer is shown in FIG. 1 of the drawings wherein an extruded aluminum floor plank A that extends the length of the trailer is positioned on top of the plurality of cross-members B and one edge C of the floor plank A is secured to each cross-member B by a screw D. An adjacent floor plank A' of the same extruded shape as floor plank A is then positioned to have an edge E overlap edge C of floor plank A and a seam weld F is applied to adjoining portions of the edges C and E to join the floor planks A and A', as well as indirectly securing that edge E of floor plank A' to the cross-members B by reason of being joined to the edge C of floor plank A that is secured directly to the cross-members B by the screws D. During use of the cargo vehicle, the floor is subjected to substantial stress loads by reason of the cargo and the twisting and bending movements of the vehicle frame, including the cross-members B, and therefore substantial stress is imposed on the edge portion C of each floor plank and the screws D that fasten the edge portion C to the cross-members B. Thus, a cross-section portion G of each edge portion C that is immediately adjacent the holes for the screws D is substantially thickened to accommodate the localized stress imposed from the screws D and compensate for the weakening holes in the edge C that are required for the screws D. This and similar prior art floor constructions have several problems including the localized stresses caused by the screws D on the floor planks A and cross-members B, the extra weight and cost of the thickened portion G, the heat transfer through the screws D in a refrigerated trailer, the inability to use more than one screw in the attached edge of a floor plank A at each cross-member B, the necessity of installing all of the screws D along one edge of a floor plank for the length of the cargo vehicle before the next floor plank can be installed, etc.

It is an object of this invention to provide a new and unique cargo vehicle floor construction and method of constructing such floor that avoid and overcome the deficiencies of the prior art floor constructions and methods, such as those noted above. Specifically, the floor construction of this invention include the use of mounting clips secured to the laterally extending support members of the vehicle, with the mounting clips and edges of the floor planks shaped to interlock for securing the floor planks to the lateral support members without any fasteners extending through the floor planks.

Another object of this invention is to provide a cargo vehicle floor construction that is comprised of rows of spaced mounting clips secured to the lateral support members of the vehicle, which rows are aligned longitudinally to receive the edges of each floor plank in an interlocking manner without fastening the floor planks directly to the lateral support members. Specifically, the interlocking shapes of the mounting clips and edges of the floor planks prevent upward movement of the floor planks and lateral movement of the floor planks in at least one lateral direction even before applying a seam weld to the edges of adjacent floor planks. More specifically, this cargo vehicle floor construction allows all of the mounting clips to be preassembled onto the lateral support members of the cargo vehicle and all of the floor planks to be installed successively without the installation of fasteners on or through the floor planks for ease of assembly.

Still another object of this invention is to provide a cargo vehicle floor construction of this type wherein the mating shapes of the mounting clips and floor plank edges are such that each floor plank is secured against lateral movement in both directions and vertical movement even before the seam welding of adjacent floor planks. More specifically, the interlocking shapes of the mounting clips and floor plank edges are such as to require the floor plank to be elastically deformed during installation to secure each floor plank to each pair of mounting clips on each lateral support member. More specifically, the interlocking shapes of the mounting clips and floor planks are such as to cause the floor plank to snap onto each pair of mounting clips.

Other and more detailed objects and advantages of this invention will appear to those skilled in the art from the detailed description of the preferred embodiments of this invention and the accompanying drawings, wherein:

FIG. 1 is a sectional elevation view of a prior art floor construction for a cargo vehicle;

FIG. 2 is a plan view of a portion of a cargo vehicle floor construction of this invention with portions of the floor planks broken away for illustrating the substructure;

FIG. 3 is a sectional elevation view taken substantially on the line 3-3 in FIG. 2 and illustrating a first embodiment of a present invention;

FIG. 4 is a sectional elevation view similar to FIG. 3 but illustrating the installation in progress of a floor plank of the first embodiment of this invention;

FIG. 5 is an enlarged sectional elevation view of a portion of the floor construction of a second embodiment of this invention;

FIG. 6 is a sectional elevation view of a portion of a third embodiment of this invention;

FIG. 7 is a sectional elevation view of a portion of a fourth embodiment of this invention;

FIG. 8 is a sectional elevation view of a portion of a fifth embodiment of this invention;

FIG. 9 is a sectional elevation view of a portion of a sixth embodiment of this invention;

FIG. 10 is a sectional elevation view of a portion of a seventh embodiment of this invention; and FIG. 11 is a sectional elevation view of a portion of a modified form of this invention similar to the first embodiment illustrated in FIG. 3 with floor planks of a flat upper surface configuration.

Referring now to FIGS. 2, 3, and 4, the substructure of the cargo vehicle 10 is provided with a plurality of cross-members or laterally extending support members 12 that are longitudinally spaced along the length of the cargo vehicle 10 and attached to the frame of the cargo vehicle 10 in the conventional manner. Typically, the lateral support members 12 are comprised of C-bars or other structural shapes adequate to support the cargo loads and for refrigerated vehicles the upper surface of each lateral support member 12 normally will be provided with an insulating member such as a wood filler. The support members 12 are longitudinally spaced an appropriate distance for supporting the floor planks 16, such as every 12 inches. A row of mounting clips 14 is mounted on each lateral support member in a predetermined spaced arrangement that depends on the width of the floor planks 16. The rows of mounting clips 14 are aligned longitudinally so that each edge of each floor plank is positioned over a longitudinally aligned series or row of mounting clips for the length of the vehicle. Each floor plank 16 is preferably of extruded aluminum and extends substantially the full length of the vehicle, with the ends fastened in a conventional manner. A convenient width for the extruded aluminum planks 16 is such that ten floor planks 16 are required across the width of the cargo vehicle 10 to provide a complete floor.

The mounting clips 14 may be comprised of various different shapes as shown in FIGS. 3–11 for mating with the various different shapes of the longitudinal edges of the floor planks 16 as shown in those Figures in accordance with this invention. Preferably the mounting clips 14 are also an extruded aluminum shape but may be made of other materials and by other means. The mounting clip 14 of FIGS. 3 and 4 has a shaped profile that includes an inverted L-shaped portion 18 on one end and a tapered post 20 on the other end, both of which extend upwardly from the base 22 of the mounting clip 14. Both extreme ends of the mounting clip 14 are provided with flanges having holes through which fasteners 24 and 26 are installed to secure the mounting clip to the lateral support member 12.

One shaped edge or end of the floor plank 16 of this first embodiment illustrated in FIGS. 3 and 4 is provided with a downwardly extending leg 28 with an inwardly directed flange 30 at the bottom end and an outwardly directed plate 32 located immediately above the bottom end of leg 28. The flange 30 is adapted to fit beneath and engage the inverted L-shaped portion 18 of mounting clip 14, as shown in FIG. 4, and the other longitudinal shaped edge or side of floor plank 16 has a downwardly extending leg 34 with an inwardly extending hook 36 for mating with a hook shaped groove 38 on tapered post 20 of the mounting clip 14. The lateral width of the floor plank 16 and the predetermined spacing of adjacent mounting clips 14 is such that when flange 30 is tightly positioned in the portion 18, as shown in FIG. 4, the hook portion 36 engages the upper portion of the tapered post 20 and downward force is required to cause the floor plank 16 to elastically deform by expanding laterally to allow the hook portion 36 to snap into the groove 38. Preferably, the hook portion 36 has a tapered inner surface that mates with the tapered outer surface of post 20 for accommodating the sliding movement therebetween during installation of the floor plank 16. The elastic deformation of the floor plank 16 primarily occurs at the leg 34 although the downwardly extending intermediated legs or segments 40 of the floor plank 16 may also elastically deform to allow the lateral expansion of the floor plank 16 during installation onto the mounting clips 14. Alternatively, an installation tool or device may be provided that elastically deforms the floor plank 16 a sufficient amount to allow the hook 36 to clear the tapered surface of post 20 whereupon the installation tool device may be released to allow the hook 36 to enter the groove 38. The leg 34 is also provided with an outwardly extending plate 42 that preferably overlaps the plate 32 of the adjacent floor plank 16 and then preferably a seam weld 44 is provided to permanently join adjacent floor planks 16. Alternatively, an adhesive, epoxy, fasteners or the like may be used to join the plates 32 and 42. The legs 28 and 34 on opposite edges or sides of each floor plank 16 are preferably vertically oriented for directly supporting the cargo load without inducing a lateral force that might tend to separate the legs 28 and 34 from their engagement with the portion 18 and post 20 of the mounting clips or to subject the weld 44 to an unnecessary lateral load. However, the intermediate segments 40 of the floor plank 16 may be vertical or slightly inclined, as shown, as is conventional. The horizontal bottom segment 46 that joins the vertical segments 40 directly engage the top surface of the lateral support members 12 for supporting the upper floor surface 48. The vertical segments 40 and bottom segments 46 form longitudinally extending troughs that are preferred for allowing cold air to circulate beneath the cargo in refrigerated trailers.

By the first embodiment of the present invention shown in FIGS. 3 and 4, it may be seen that the mounting clips 14 are separate from the floor planks 16 and may be preassembled on the lateral support members 12, such as on a machine or fixture, before mounting the support members on the cargo vehicle 10 or at least before the start of installing the floor planks 16. The inverted L-shaped portion 18 of each mounting clip 14 prevents lateral movement in one direction (to the left as shown in FIG. 3) of the floor plank 16, the post 20 prevents lateral movement in the other direction (to the right as shown in FIG. 3) of the floor plank 16, and both the portion 18 and the post 20 prevent upward movement of the floor plank 16 by interengagement with the flange 30 and hook 36, respectively. Thus, all of the floor planks 16 are securely mounted to the lateral support members 12 without any fasteners piercing the floor planks 16. The mounting clips 14 are securely connected to the lateral support members 12 by two fasteners 24 and 26 for each mounting clip, which is twice as many fasteners as possible with the fasteners D of the prior art construction illustrated in FIG. 1, whereby the loads and stresses between the floor planks 16 and the lateral support members 12 are more effectively distributed.

Referring now to FIG. 5, a second embodiment of this invention is illustrated in which the only differences from the first embodiment are in one of the shapes of the mating portions of the mounting clip 14 and the floor plank 16, which is also true of each of the other embodiments of this invention. In other words, the mounting clips in all of the embodiments are secured in spaced relationship on each of the lateral support members 12 in longitudinal alignment for receiving the floor planks, as shown in the plan view of FIG. 2, and only the shaped profiles of the mounting clips and floor plank edges differ. In the embodiment of FIG. 5, the shaped profile of mounting clip 114 has an inverted L-shaped portion 118 similar to portion 18 of the first embodiment for receiving an inwardly extending flange 130 of floor plank 116, similar to flange 30 of the first embodiment. A similar or identical inverted L-shaped portion 150 is also provided on mounting clip 114 for receiving an outwardly directed flange 152 of the edge of the adjacent floor plank 116. The portions 118 and 150 of mounting clip 114 prevent upward movement of the floor planks 116 and lateral movement in only one direction rather than two directions, as with the first embodiment, and do not provide the snap-in-place arrangement of the first embodiment. The floor planks 116 are provided with plates 132 and 142 for accommodating the seam weld 144. With this second embodiment, the floor plank 116 at the lateral extreme (to the right as shown in FIG. 5) of the cargo vehicle must be secured to the lateral support members 12 or other structure of the cargo vehicle to prevent lateral movement of the assembled floor.

In the third embodiment of this invention illustrated in FIG. 6, the shaped profile of mounting clip 214 is provided with only one inverted L-shaped portion 218 which receives an inwardly directed flange 230 on vertical leg 228 of the floor plank 216. The other vertical leg 234 of the floor plank 216 is provided with a foot portion 254 that slides under the plate 232 and provides a location for the seam weld 244. Again, vertical movement and lateral movement in one direction of the floor planks 216 is prevented by the portion 218 of mounting clip 214 but lateral movement in the other direction is provided by other means.

In the fourth embodiment of this invention illustrated in FIG. 7, the shaped profile of mounting clip 314 is provided with an inverted L-shape portion 318 for engaging an outwardly extending flange 330 on vertical leg 328. The shaped profile of mounting clip 314 is also provided with a post 356 for engaging the lower end of vertical leg 328 to prevent lateral movement. It should be noted that the flange 330 is curved to allow it to be inserted under the inverted L-shaped portion 318 while the floor plank 316 is tilted to then allow the lower end of vertical leg 328 to engage the post 356. By this arrangement, the mounting clip 314 prevents vertical movement of the floor plank 316 and lateral movement in both directions. Again, plates 332 and 342 are provided for accommodating the weld 344.

The fifth embodiment of this invention shown in FIG. 8 is similar to the fourth embodiment in providing an inverted L-shaped portion 418 and a post 456 in the shaped profile of the mounting clip 414 for a flange 430 and the vertical leg 428 of the floor plank 416 to engage. In this embodiment, the plate 432 and plate 444 are of a predetermined length to interfere with each other when the right hand floor plank 416 is installed in the direction of arrow 458 whereupon plate 444 snaps past plate 432 to the position shown in FIG. 8. The ends of plates 432 and 444 preferably are tapered to enhance this snap action. In view of the close contact between plates 432 and 444, the seam weld therebetween may not be required, although it is preferred.

In the sixth embodiment of this invention shown in FIG. 9, the shaped profile of mounting clip 514 is provided with an inverted L-shaped portion 518 for mating with an outwardly extending flange 530 on vertical leg 528 of floor plank 516. The shaped profile of mounting clip 514 is also provided with a tapered post 520 with a groove 538 into which a hook portion 536 of the other vertical leg 534 snaps when installing successive floor planks 516, similar to the arrangement of the first embodiment. Again, with this sixth embodiment, lateral movement in both directions and vertical movement of the floor planks 516 are prevent by the interlocking shapes of the mounting clip 514 and the legs 528 and 534.

The seventh embodiment of this invention shown in FIG. 10 is very similar to the first embodiment shown in FIGS. 2 and 3 in that the shaped profile of mounting clip 614 is provided with an inverted L-shaped portion 618 which engages an inwardly directed flange 630 of one leg of the floor plank 616 and a tapered post 620 that engages a hook 636 on the other leg portion of the floor plank 616. Mounting clip 614 also provides a post 660 at the joint or space between the plate 632 and the plate 642 for accommodating the seam weld 644 to join the post 660 of mounting clip 614 to the plates 632 and 642.

The eighth embodiment shown in FIG. 11 has the same shaped profile of the mounting clip 14 as the first embodiment for engaging the two vertical legs 728 and 734 of floor plank 716 that are the same as the vertical legs 28 and 34, respectively, of the first embodiment. Floor plank 716 differs from floor plank 16 of the first embodiment in providing a flat floor surface for supporting the cargo, such as may be used for dry cargo or refrigerated cargo that does not require the floor troughs. The floor plank 716 of this embodiment is provided with a plurality of vertical legs 762 with flange portions 764 at the bottom for engaging the lateral support member 12 and providing the structural strength required of the floor planks.

By this invention in its various embodiments, a cargo vehicle floor construction is provided that is easily installed on the cargo vehicle in a labor saving manner and results in a stronger floor construction without an increase in weight. It will readily appear to those skilled in the art that various modifications may be made to the disclosed embodiments of this invention, such as still further mating and interlocking profile shapes of the floor planks and mounting clips, without departing from this invention.

What is claimed:

1. A cargo vehicle floor construction for mounting on a plurality of lateral support member extending across a width of the cargo vehicle, comprising, a plurality of longitudinally extending floor planks positioned side-by-side across the width of the cargo vehicle on the lateral support members, each floor plank extending for a substantial length of the cargo vehicle, each said floor plank having a longitudinal edge on each lateral side that is shaped to mate with an adjacent shaped edge of an adjacent floor plank, a plurality of mounting clips fixedly mounted on the lateral support members in locations beneath each of said adjacent shaped edges of said floor planks, each said mounting clip having a fixed shaped profile for receiving and on an upper surface thereof each shaped edge of a pair of adjacent floor planks each said shaped profile and pair of adjacent said shaped edges having cooperating shapes for securing said adjacent floor planks against movement in an upward direction and at least one lateral direction.

2. The cargo vehicle floor construction of claim 1, wherein said mating shaped edges of said pair of adjacent floor planks include mating portions forming a seam, and means applied to said mating portion at the seam for joining said pair of adjacent floor planks.

3. The cargo vehicle floor construction of claim 1, wherein said mating shaped edges of said pair of adjacent floor planks include mating portions forming a seam for a longitudinal weld on upwardly facing surfaces of the same adjoining said pair of adjacent floor planks.

4. The cargo vehicle floor construction of claim 3, wherein said seam comprises overlapping mating portion of said shaped edges for forming said weld.

5. The cargo vehicle floor construction of claim 1, wherein said cooperating shapes of each said shaped profile and pair of adjacent shaped edges retain said adjacent floor planks against movement in both lateral directions.

6. The cargo vehicle floor construction of claim 1, wherein said shaped profile includes a pair of upwardly extending projections, each said projection engaging said shaped edge of one of said pair of adjacent floor planks.

7. The cargo vehicle floor construction of claim 6, wherein each said projection includes a vertically extending portion for preventing lateral movement of said engaged shaped edge in one lateral direction, and a horizontally extending portion overlying a portion of said engaged shaped edge for preventing movement in an upward direction.

8. The cargo vehicle floor construction of claim 7, wherein at least one of said pair of projections is in the form of an inverted L.

9. The cargo vehicle floor construction of claim 7, wherein at least one of said pair of projections is in the form of a substantially vertical post with a horizontally facing groove forming said horizontally extending portion.

10. The cargo vehicle floor construction of claim 1, wherein each said floor plank includes a horizontally extending upper surface between said shaped edges, and each said shaped edge including a leg portion extending vertically downwardly from said upper surface, said vertical leg portion engaging an upper surface of said mounting clip.

11. The cargo vehicle floor construction of claim 10, wherein said upper surface is substantially continuous between said lateral sides of each floor plank.

12. The cargo vehicle floor construction of claim 11, wherein each said floor plank includes a plurality of longitudinally extending support legs extending downwardly from said upper surface and engaging the lateral support members for supporting said upper surface.

13. The cargo vehicle floor construction of claim 10, wherein said upper surface is interrupted by a plurality of troughs between said lateral sides of each floor plank.

14. A cargo vehicle floor construction for mounting on a plurality of lateral support members extending across a width of the cargo vehicle, comprising:
 a plurality of longitudinally extending floor planks positioned side-by-side across the width of the cargo vehicle on the lateral support members, each floor plank extending for a substantial length of the cargo vehicle, each said floor plank having a longitudinal edge on each lateral side that is shaped to mate with an adjacent shaped edge of an adjacent floor plank, a plurality of mounting clips mounted on the lateral support members in locations beneath each of said adjacent shaped edges of said floor planks, each said mounting clip having a shaped profile for receiving and supporting each shaped edge of pair of adjacent floor planks, each said shaped profile and pair of adjacent said shaped edges having cooperating shapes for retaining said adjacent floor planks against movement in an upward direction and at least one lateral direction;
 wherein each said floor plank includes one said shaped edge along one said lateral side having a horizontally extending portion that extends in one lateral direction and the other said shaped edge along the other said lateral side having a horizontally extending portion that extends in the opposite horizontal direction, said mounting clips that are mounted beneath said one lateral side and said other lateral side having a pair of horizontally extending openings in each said shaped profile for receiving the two oppositely horizontally extending portions of said shaped edge, and a pair of said mounting clips being mounted on the lateral support members for each said floor plank at a spacing for requiring elastic deformation of said floor plank in horizontal direction to change the horizontal distance between said horizontally extending portions for causing said horizontally extending portions to engage said horizontally extending openings upon release of said elastic deformation.

15. The cargo vehicle floor construction of claim 14, wherein said floor plank includes a horizontally extending upper surface between said shaped edges, and each said shaped edge includes a leg portion extending vertically downwardly from said upper surface, said elastic deformation occurring primarily in said leg portions.

16. The cargo vehicle floor construction of claim 14, wherein said one shaped edge includes a downwardly tapered portion below said horizontally extending portion, said shaped profile includes an upwardly tapered portion above one of said horizontally extending openings, and said downwardly tapered portion and upwardly tapered portion positioned for mutual engagement to cause said elastic deformation upon downward movement of said floor plank onto said mounting clip.

17. The cargo vehicle floor construction of claim 16, wherein said other shaped edge includes an L-shaped portion, and the other said horizontally extending openings for receiving said horizontally extending portion of said other shaped edge includes an inverted L-shaped member for receiving said L-shaped portion.

18. The cargo vehicle floor construction of claim 1, wherein each said mounting clip is mounted on the lateral support member by a pair of spaced fasteners located outside a location of said shaped profile.

19. A cargo vehicle floor construction for mounting on a plurality of lateral support members extending across a width of the cargo vehicle, comprising, a plurality of mounting clips fixedly secured to the lateral support members in longitudinal rows that are spaced laterally, and a plurality of longitudinally extending floor planks positioned side-by-side across the width of the cargo vehicle, juxtaposed edges of said planks positioned on an upper surface of said mounting clips, each said floor plank having at least one longitudinal edge shaped for engaging and mating with an upward projection of said upper surface of a row of said mounting clips for retaining said one longitudinal edge of said floor plank against movement in an upward direction and at least one lateral direction.

20. The cargo vehicle floor construction of claim 19, wherein a pair of adjacent floor planks include mating portions forming a seam, and means applied to said mating portion for joining said pair of adjacent floor planks.

21. The cargo vehicle floor construction of claim 19, wherein each said mounting clip upward protection includes a shaped profile for interlocked mating with both adjacent longitudinal edges of adjacent said floor planks.

22. The cargo vehicle floor construction of claim 21, wherein said shaped profile and adjacent edges retain said adjacent floor planks against movement in both lateral directions.

23. The cargo vehicle floor construction of claim 21, wherein said shaped profile includes a pair of upwardly extending projections, each said projection engaging said edge of one of said adjacent floor planks.

24. The cargo vehicle floor construction of claim 23, wherein each said projection includes a vertically extending portion for preventing lateral movement of said engaged edge in one lateral direction, and a horizontally extending portion overlying a portion of said engaged edge for preventing movement in an upward direction.

25. The cargo vehicle floor construction of claim 24, wherein at least one of said pair of projections is in the form of an inverted L.

26. A cargo vehicle floor construction for mounting on a plurality of lateral support members extending across a width of the cargo vehicle, comprising, a plurality of mounting clips fixedly secured to the lateral support members in longitudinal rows that are spaced laterally, and a plurality of longitudinally extending floor planks positioned side-by-side across the width of the cargo vehicle on said mounting clips and the lateral support members, each said floor plank having a pair of longitudinal edges shaped to engage and mate with a pair of adjacent longitudinal rows of said mounting clips by at least one said plank edge having a portion for being elastically deformed over and locking to a portion of the mating row of mounting clips with the other said plank edge engaging another row of mounting clips for securing said edges of said floor plank against movement in an upward direction and both lateral directions.

27. The cargo vehicle floor construction of claim 26, wherein a pair of adjacent floor planks include mating portions forming a seam, and means applied to said mating portion for joining said pair of adjacent floor planks.

28. The cargo vehicle floor construction of claim 26, wherein each said mounting clip includes a shaped profile for interlocking mating with adjacent longitudinal edges of adjacent said floor planks.

29. The cargo vehicle floor construction of claim 28, wherein said shaped profile includes a pair of upwardly extending projections, each said projection engaging said edge of one of said adjacent floor planks.

30. The cargo vehicle floor construction of claim 29, wherein each said projection includes a vertically extending portion for preventing lateral movement of said engaged edge in one lateral direction, and a horizontally extending portion overlying a portion of said engaged edge for preventing movement in an upward direction.

31. The cargo vehicle floor construction of claim 28, wherein said shaped profile includes a tapered shape for engaging a portion of said plank edge for causing progressive bending of said portion of said plank edge during said elastic deformation movement for snapping over said tapered shape.

32. The cargo vehicle floor construction of claim 31, wherein said portion of said plank edge includes a tapered shape for mating with said tapered shape of said shaped profile of said mounting clips.

\* \* \* \* \*